United States Patent [19]

Mole

[11] 4,041,337
[45] Aug. 9, 1977

[54] SEGMENTED MAGNET HOMOPOLAR DYNAMOELECTRIC MACHINES HAVING FLUID COOLED LIQUID METAL CURRENT COLLECTING ZONES

[75] Inventor: Cecil J. Mole, Monroeville, Pa.

[73] Assignee: Westinghouse Electric Corporation, Pittsburgh, Pa.

[21] Appl. No.: 605,964

[22] Filed: Aug. 19, 1975

Related U.S. Application Data

[63] Continuation of Ser. No. 338,489, March 6, 1973, now Defensive Publication No. T920,005.

[51] Int. Cl.² .......................................... H02K 31/00
[52] U.S. Cl. .................................................. 310/178
[58] Field of Search ................. 310/178, 54, 219, 64, 310/232, 58; 318/253; 322/48

[56] References Cited

U.S. PATENT DOCUMENTS

| | | | |
|---|---|---|---|
| 1,184,224 | 5/1916 | Breslaver | 310/178 |
| 2,401,166 | 5/1946 | Kobel | 310/178 |
| 2,786,155 | 3/1957 | Sellers | 310/219 |
| 2,845,554 | 7/1958 | Schwab | 310/219 |
| 2,869,007 | 1/1959 | Ringland | 310/178 |
| 3,168,666 | 2/1965 | Grobel | 310/219 |
| 3,293,470 | 12/1966 | Polgreen | 310/178 |
| 3,295,091 | 12/1966 | Von Mossin | 310/219 |

*Primary Examiner*—R. Skudy
*Attorney, Agent, or Firm*—G. H. Telfer

[57] ABSTRACT

A homopolar dynamoelectric machine is constructed with a magnetic field that is broken into segments along the axis of the machine. Liquid metal contacts are utilized to transmit electrical energy between the armature and current collecting members which have ducts for the transmission of cooling fluid located therein. Grouping armature conductors, and appropriately interconnecting the current collecting members to serially relate the voltages induced in the armature conductors in order to increase the magnitude of the output voltage, permits achievement of the desired output characteristics.

12 Claims, 10 Drawing Figures

SEGMENTED MAGNET HOMOPOLAR DYNAMOELECTRIC MACHINES HAVING FLUID COOLED LIQUID METAL CURRENT COLLECTING ZONES

RELATED APPLICATION

This is a continuation of application Ser. No. 338,489, filed Mar. 6, 1973, and issued as a Defensive Publication No. T920,005

BACKGROUND OF THE INVENTION

1. Field of the Invention

This invention relates primarily to homopolar dynamoelectric machinery, and more specifically, this invention relates to a segmented magnet homopolar dynamoelectric machine that utilizes a fluid cooled liquid metal current collecting arrangement.

2. Description of the Prior Art

Many types of homopolar motors and generators have been proposed and constructed in the past. These have included homopolar machines with segmented drums and discs, multi-layer drums, or single drums and discs. Conventional designs have required very large magnets to produce the large magnetic fluxes that link the armature conductors to produce therein the necessary voltages and currents.

Some attempts were made in the past to increase the output capabilities of homopolar machines by utilizing a multiplicity of magnetic poles along the axis of the machine. Examples of such attempts are illustrated in U.S. Pat. No. 339,772 — Hering; U.S. Pat. No. 1,271,061 — Morse; U.S. Pat. No. 1,327,349 — Morse; and U.S. Pat. No. 1,327,350 — Morse. While these patents do reveal the concept of utilizing multiple magnetic circuits to increase the power capabilities of homopolar dynamoelectric machines, no commercially feasible machine of this type has apparently ever been produced.

With the increasing attention being directed toward the use of superconductors, the utilization of super-conductive coils to provide the high fields needed in a homopolar dynamoelectric machine seems attractive. Efforts are presently being made to develop rotating disc and concentric drum homopolar machines utilizing single super-conductive magnets. The use of a single or double magnet with rotating drum armature machines is known. However, all such machines use large flux systems, with large air gaps, and consequently require high energy excitation systems.

In view of the significantly larger currents being produced by homopolar machines having superconductive magnets, the old mechanical brush method of transferring current from a moving to a stationary member became outmoded, as mechanical brushes can not handle the large current densities for any significant period of time. Thus, liquid metal current collecting arrangements have become necessary. Liquid metal current collection arrangements have the capability of handling high current densities, but the liquid metal has to operate in low flux fields to keep magneto-hydrodynamic losses in the liquid metal to a reasonable level. This means that unsaturated ferromagnetic material must be located in the vicinity of the current collection zone in order to protect the liquid metal from excessive magneto-hydrodynamic losses.

An example of the prior art single magnet structure utilizing a liquid metal current collecting arrangement is shown in the Aug. 12, 1971 issue of "The engineer," pages 39–40. As in all examples of this type of machine, the machine is relatively large and heavy for the output powers obtained, a high energy excitation system is required to provide the necessary magnetic flux, and dissipation of the heat produced in the liquid metal current collecting arrangement is inadequate.

SUMMARY OF THE INVENTION

The present invention relates to homopolar dynamoelectric machines that obviate the difficulties found in prior art devices. To achieve these benefits, a conductor carrying member, such as a generally cylindrical ferromagnetic shell, is mounted for rotation. In shell slots formed in the outer portion of the shell, a plurality of conductive lengths, or conductors, are positioned in an axial direction at spaced intervals about the circumference of the shell. The conductors are formed into sets of conductors, each set of conductors being spaced at discrete intervals in an axial direction.

Current collecting projecting rings are located at each end of each set of conductors. Groups of conductors in each set are connected to a current collecting projecting ring that is common to that groups and axially displaced from the current collecting projecting rings common to other groups.

A stationary magnetic field producing structure, such as a ferromagnetic core, is positioned outside of the shell and concentric therewith. As a result of the rotation of the shell, relative motion between the shell and the core is achieved. Core slots are formed in the inner portion of the ferromagnetic core at axial intervals. Excitation coils are formed into excitation windings and located in these core slots. In addition, current collecting annular members are also located in the core slots. The current collecting annular members have grooves formed therein to mate with the current collecting projecting rings on the shell. A liquid metal is located in these grooves to provide a conductive connection between the projecting rings and the annular members. Ducts to convey a cooling fluid, such as water, are located in the current collecting annular members. By appropriately interconnecting the current collecting annular members, the voltages induced in each group of conductors may be serially related (i.e., connected in series), so that the output voltage may be greatly increased.

Each of the excitation rings may be provided with a current flowing in the opposite direction than the current flowing in an adjacent winding, so that the effective flux for each of the conductors is thereby increased. In addition, the core may be shaped in accordance with the flux pattern produced therein to reduce the amount of ferromagnetic material utilized in the machine and thereby reduce the weight and cost of the machine.

With this construction, the stationary and rotating members have very thin radial dimensions and, consequently, a very small, lightweight homopolar dynamoelectric machine may be produced. In addition, the construction of the present invention permits very small air gaps between the shell and the core, so that short flux paths and the attendant smaller excitation requirements result. Further, the provision of cooling ducts directly through the current collecting annular members permits rapid and effective dissipation of the heat generated in the liquid metal, thus permitting a practical utilization of this type of arrangement.

The foregoing and other objects, advantages and features of this invention will hereinafter appear, and for purposes of illustration, but not of limitation, exemplary embodiments of the subject invention are shown in the appended drawing.

DETAILED DESCRIPTION OF THE PREFERRED EMBODIMENTS

Figure 1:
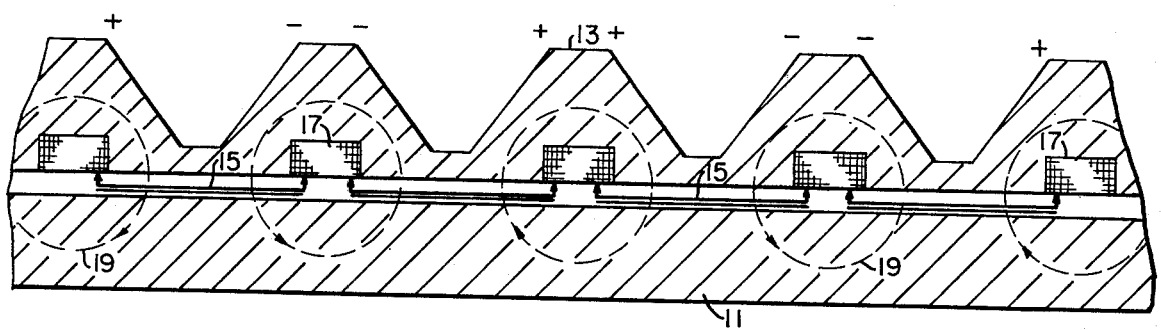
FIG. 1 is a schematic axial cross-sectional view illustrating a portion of a homopolar dynamoelectric machine constructed in accordance with the present invention.

FIG. 1 schematically illustrates a drum-shaped homopolar dynamoelectric machine constructed in accordance with the present invention. As may be seen, an inner generally cylindrical shell 11 is formed of ferromagnetic material. Concentric with and outside of ferromagnetic shell 11 there is located a ferromagnetic core 13. In this particular embodiment, ferromagnetic core 13 is stationarily mounted, while ferromagnetic shell 11 is mounted for rotation, which results in a relative rotation between the shell and the core. Of course, it would be equally feasible to maintain the shell 11 stationary and rotate core 13. Further, it should be recognized that shell 11 could be located outside of core 13 and still provide an operative homopolar machine.

A plurality of electrical conductors 15 are spaced at intervals about the circumference of ferromagnetic shell 11. These conductors 15 are arranged in axially displaced sets along the outer portion of shell 11. (With the axial cross-sectional view of FIG. 1, only one of the conductors 15 in each of the sets of conductors is seen.)

Excitation coils or windings 17 are located in the inner portion of core 13 at axially spaced intervals. Conductors 15 extend between adjacent pairs of the excitation winding 17. As is indicated by the dashed lines 19 that illustrate the flow of magnetic flux, opposite directions of current flow are utilized in adjacent windings to produce magnetic fluxes having opposite directions of flow. In this way, each of the conductors 15 cuts the flux of two adjacent windings to essentially double the voltage induced therein. In other words, by utilizing opposite directions of current flow in adjacent excitation windings the flux seen by each of the conductors 15 is the same (with respect to the poliarity of induced voltage). Thus, not only is the utilized flux increased, but both conductors ends adjacent an excitation winding have the same polarity, as is demonstrated by the polarity signs in FIG. 1.

It may also be seen that the ferromagnetic core 13 is shaped in the form of the pattern of flux produced by excitation winding 17. In this fashion there is a considerable savings of ferromagnetic material and the machine is, consequently, lighter and less expensive.

Figure 2:
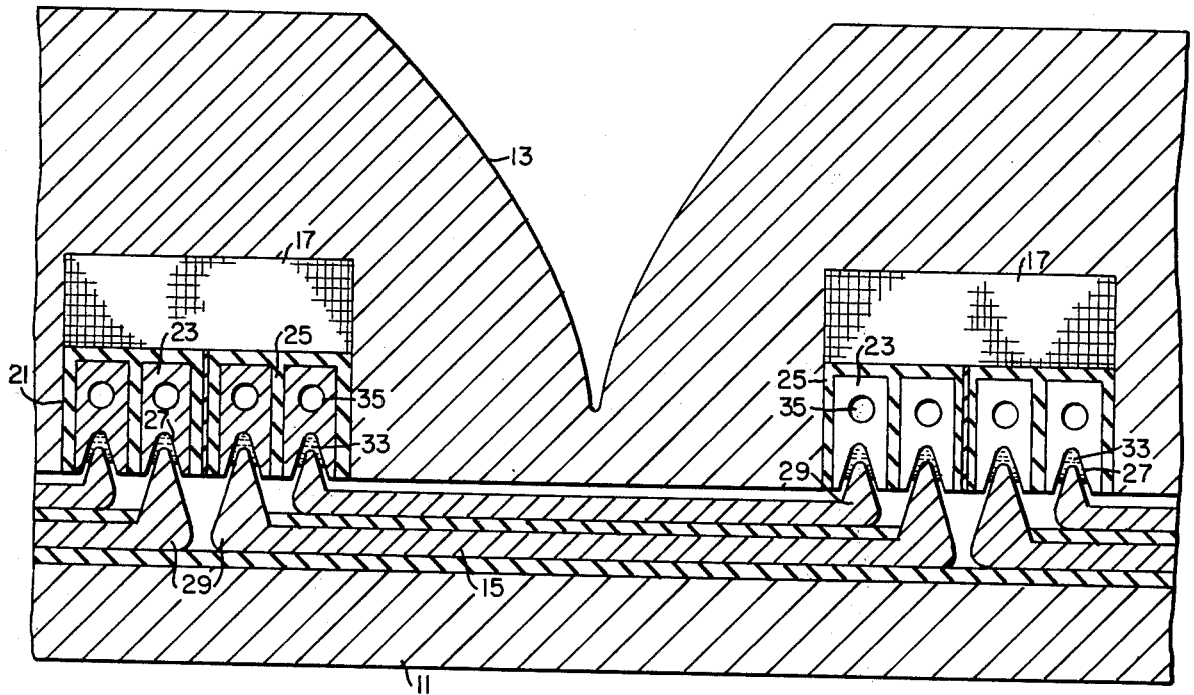
FIG. 2 is an enlarged view of one segment of the structure depicted in FIG. 1.

The structure of this machine may be more completely understood by reference to the enlarged view of one segment as set forth in FIG. 2. As may be seen in that view, core slots 21 are formed in core 13. Excitation windings 17 are located in the bottom of core slots 21. In the remaining areas of core slots 21 there are located current collecting annular members 23. Annular members 23 are made of a suitable conducting material. At least two annular members 23 will be located in each core slot 21 (except for the core slots at each end of the machine). As illustrated in the embodiment of FIG. 2, more annular members 23 may be utilized than the basic two that are required for each end of the conductors. In this particular embodidment, a total of four annular members 23 are located in each core slot 21. Annular members 23 are insulated from each other and from core slot 21 by suitable insulating material 25.

Each of the annular members 23 has a groove 27 formed therein. These grooves are annular in shape and extend about the entire inner circumference of the annular members 23. Grooves 27 are formed to appropriately mate with current collecting projecting rings 29 that are located on the shell 11. Projecting rings 29 are electrically connected to the conductors 15 and serve to collect the current from a group of these conductors for transmittal to the annular members 23. As illustrated in FIG. 2, two projecting rings 29 are located at each end of one set of conductors 15. The reason for this is that alternate conductors in the set of conductors 15 are connected to one or the other of the projecting rings 29. Thus, one group of conductors is connected to one of the projecting rings (at each end) and another group of conductors is connected to the other projecting ring 29. By appropriately interconnecting annular members 23, the voltages generated in each of the groups of conductors 15 may be connected in series to increase the magnitude of the output voltage.

Figure 3:
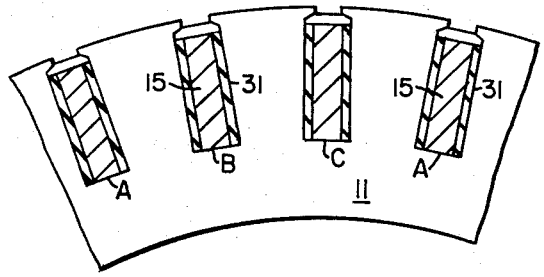
FIG. 3 is a fragmentary schematic transverse cross-sectional view illustrating one method of locating conductors in which voltages are generated by a machine constructed pursuant to the present invention.

FIGS. 3-6 illustrate two ways in which conductors 15 may be mounted in shell 11, as well as ways of interconnecting groups of these conductors to provide the desired serial relationship between the generated voltages. In FIG. 3 it may be seen that individual conductors 15 are embedded in shell slots 31 that are formed in the outer portion of shell 11. The slots 31 are spaced at intervals about the circumference of shell 11, and the conductors 15 embedded therein are appropriately insulated from the slots.

Figure 4:
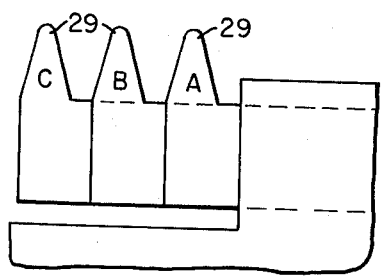
FIG. 4 is a schematic illustration of one way of connecting groups of conductors positioned as illustrated in FIG. 3.

In FIG. 4 three projecting rings 29 have been indicated as A, B and C. These projecting rings correspond to the slots designated by the same letters A, B and C in FIG. 3. The designations in FIG. 3 are cyclically recurring so that every third slot is an "A," a "B" slot follows each "A" slot, etc. The conductors in all of the "A" slots are electrically interconnected and connected to the projecting ring 29 that has also been labeled "A." In a similar fashion, all of the conductors 15 in the slots labeled "B" are attached to the projecting ring 29 that is labeled "B," and the same for the conductors labeled "C." For a structure of this nature, instead of the two annular members 23 illustrated in FIG. 2, there would be three annular members corresponding to the projecting rings A, B and C. By appropriately interconnecting the annular members associated with each end of conductors 15, the output voltage could be effectively trebled from that appearing in a single one of the conductors 15.

Figure 5:
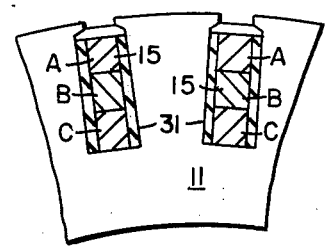
FIG. 5 is a fragmentary schematic cross-sectional view similar to FIG. 3 illustrating another method of positioning the conductors.
Figure 6:
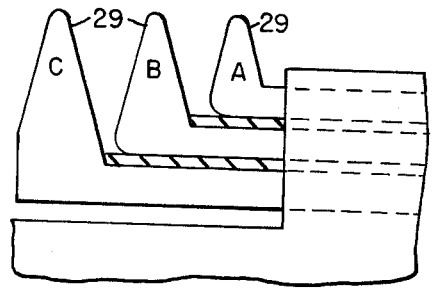
FIG. 6 is a schematic view similar to FIG. 4 illustrating a method of connecting conductors positioned according to FIG. 5.

FIG. 5 illustrates another method of mounting conductors 15 in shell 11. In this case, three conductors have been stacked in ach shell slot 31. The three conductors in each shell slot 31 have been designated A, B and C and are suitably separated from each other by insulating material. As in the case of the embodiment of FIGS. 3 and 4, FIG. 6 illustrates how the conductors of FIG. 5 may be connected in groups to projecting rings 29 that are similarly designated A, B and C. As in the case of the FIGS. 3 and 4 embodiment, the output voltage of the machine utilizing the structure depicted in FIGS. 5 and 6 is effectively trebled over that generated in a single conductor 15.

Referring back to FIG. 2, it may be seen that current collected on the projecting rings 29 is conveyed to the annular members 23 by a liquid metal conductor 33. Liquid metal 33 is located in the grooves 27 and is appropriately interfaced with the projecting rings 29 and the inner portion of the grooves 27 to provide an electrically conductive path between projecting rings 29 and annular members 23. Liquid metal 33 is any appropriate type of liquid metal, such as sodium-potassium or gallium induim Location of the current collecting system in the core slots 21 means that the magnetic flux in the liquid metal 33 is effectively limited to leakage flux. Thus, the magneto-hydrodynamic losses that occur in the liquid metal 33 are held to a minimum. However, as a result of the high current densities that must be handled by the liquid metal 33, there is considerable heating at these current collecting stations. To alleviate this heating problem and dissipate the heat that is thus produced, cooling ducts 35 are formed in annular members 23. By passing an appropriate cooling fluid through ducts 35, the cooling that is achieved is much greater than that accomplished by mere air cooling. As a result, the effective cooling that is achieved permits an appropriate utilization of the segmented magnet structure incorporating a liquid metal current collecting system.

Figure 7:
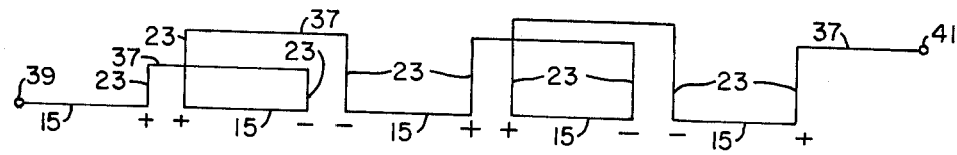
FIG. 7 is a schematic illustration of one way of interconnecting current collecting members to serially relate the voltages generated in the conductors.

As previously indicated, by appropriate interconnections of the annular members 23 the voltages generated in the conductors could be serially related to increase the output voltage of a machine. FIG. 7 schematically illustrates how this may be accomplished. Groups of conductors 15 are schematically illustrated and have been identified by the designation 15. Similarly, annular members 23 are schematically illustrated as identified. It may be seen that by interconnecting annular members 23 with interconnections 37 as shown, the voltages generated in the four groups of conductors 15 that are shown in FIG. 7 are connected in series, so that the output voltage obtained across terminals 39 and 41 is essentially four times that generated in any of the conductors 15.

Interconnections 37 may be made either internally or externally of the core. In other words, interconnections 37 may be embedded conductors, or conductors may be run from annular members 23 to the exterior of core 13 to permit the interconnections 37 to be made externally thereof. Further, the interconnections need not be in series as illustrated in FIG. 7, but for low voltage, high current applications the interconnections 37 could be such as to place the groups of conductors in parallel.

Figure 8:
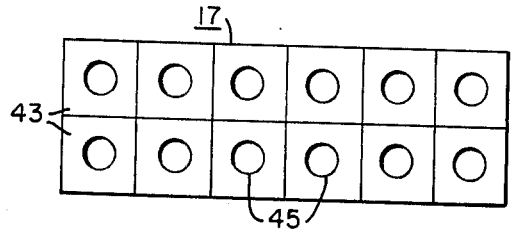
FIG. 8 is a schematic illustration of a portion of an excitation winding utilizing water cooled conventional conductors.
Figure 9:
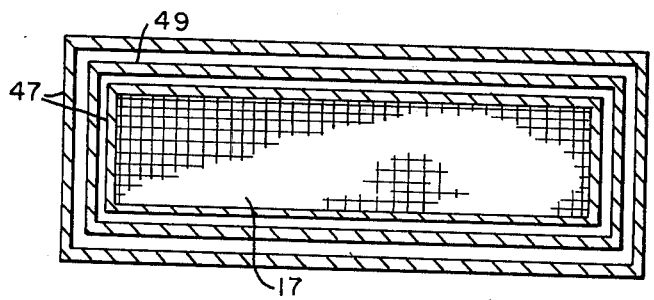
FIG. 9 is a schematic view illustrating an insulated superconducting excitation winding.
Figure 10:
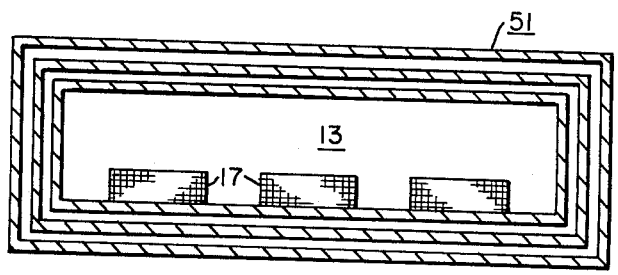
FIG. 10 is a schematic view in which the entire excitation structure utilizing superconducting windings is thermally insulated.

In FIGS. 8-10 various arrangements are shown which could be utilized for the excitation windings 17. In FIG. 8 a partial cross-sectional view of a non-superconducting winding 17 is depicted. This non-superconducting winding is made from conventional conductors 43 having a square or rectangular cross-section. Each of the conductors has a duct 45 located therein for cooling purposes, such as bypassing water therethrough.

In FIG. 9 a superconductive winding is utilized as excitation winding 17. A dewar vessel having dewar walls 47 is utilized to insulate the winding 17. A vacuum is created between walls 47 and a radiation shield 49 is located therein to further reduce heat loss.

In FIG. 10 the superconductive excitation windings and the core are all surrounded by a single dewar vessel 51 that is constructed in the same fashion as the dewar vessel in FIG. 9.

As a result of the extremely high fields produced by superconductive windings, with the resultant much higher flux densities at the current collecting stations, the efficiency of a homopolar machine constructed in accordance with the present invention would appear to be more efficient utilizing conventional conductors, as in FIG. 8, up to a power output of approximately 100 megawatts. However, this is merely a suggested range and it may well be that future advances in magnetic shielding or other ways of reducing the magneto-hydrodynamic losses in liquid metals would make the use of superconductors at lower power outputs more feasible. In any event, the structure disclosed herein is equally operable with either superconducting or non-superconducting excitation windings and is not restricted to the use of either.

It should be understood that various modifications, changes and variations may be made in the arrangements, operations and details of construction of the elements disclosed herein without departing from the spirit and scope of the present invention.

I claim:
1. A homopolar dynamoelectric machine comprising:
    a generally cylindrical shell of ferromagnetic material;
    a generally cylindrical core of ferromagnetic material concentric with said shell, said core and said shell mounted for relative rotation therebetween;
    a plurality of electrical conductors supported by said shell and spaced at intervals about the circumference thereof, said conductors being arranged in a plurality of axially displaced sets, said conductors being separated by insulation from said shell;
    excitation coils located in said core to form a plurality of magnetic poles, on such magnetic pole adjacent each of said sets of conductors;
    current collecting projecting rings electrically connected to the ends of said conductors; and,
    means for collecting current from said current collecting projecting rings.
2. A dynamoelectric machine as claimed in claim 1 wherein:
    said shell is positioned inside of said core; and said conductors are located in shell slots formed in the outer portion of said shell.

3. A dynamoelectric machine as claimed in claim 2 wherein a plurality of said conductors are stacked in each of said shell slots.

4. A dynamoelectric machine as claimed in claim 1 wherein: p1 said core is stationary; and
said shell is rotated.

5. A dynamoelectric machine as claimed in claim 1 wherein:
core slots are formed in said core;
said excitation coils are positioned in said core slots; and
said means for collecting current comprises a plurality of current collecting annular members positioned in said core slots, said annular members having grooves mating with respective ones of said projecting rings and conductively related therewith by liquid metal in said grooves.

6. A dynamoelectric machine as claimed in claim 1 wherein said core is shaped to match the pattern of magnetic flux in said core.

7. A dynamoelectric machine as claimed in claim 1 wherein:
said excitation coils are formed into a plurality of excitation windings axially spaced along said core; and
adjacent ones of said excitation windings have opposite directions of current flow therein.

8. A dynamoelectric machine as claimed in claim 1 wherein:
each of a plurality of groups of said conductors is connected to a current collecting projecting ring common to that group; and
said means for collecting current comprises a plurality of members corresponding in number to said current collecting projecting rings and said collecting members are electrically interconnected to cause the voltage generated said groups of conductors to be serially related.

9. A dynamoelectric machine as claimed in claim 1 wherein:
said shell is positioned inside of said core and mounted for rotation with respect thereto;
said conductors are located in shell slots formed in the outer portion of said shell;
said core is stationarily mounted and shaped to match the flux pattern therein;
core slots are formed in the inner portion of said core;
said excitation coils and said current collecting annular members are positioned in said core slots;
said conductors are connected in groups to said current collecting projecting rings, each of said groups of conductors being connected to a current collecting projecting ring common to that group; and
said means for collecting current comprises a plurality of members corresponding in number to said current collecting projecting rings and said collecting members are electrically interconnected to cause the voltages generated in said groups of conductors to be serially related.

10. A dynamoelectric machine as claimed in claim 1 wherein: ducts are located in said current collecting annular members to convey cooling fluid therethrough.

11. A dynamoelectric machine comprising:
a conductor carrying member having a plurality of conductive lengths supported by and insulated from said member;
a magnetic field producing structure, said conductor carrying member and said magnetic field structure mounted for relative motion therebetween;
current collecting projecting rings electrically connected to the ends of said conductive lengths;
current collecting annular members having grooves formed therein, said current collecting annular members mounted to have said current collecting projecting rings mate with said grooves;
liquid metal located in said grooves to provide an electrically conductive connection between said current collecting projecting rings and said current collecting annular members; and
ducts located in said current collecting annular members to convey cooling fluid therethrough.

12. A dynamoelectric machine in accordance with claim 11, wherein:
said plurality of conductive lengths comprise a plurality of axially spaced groups, each of said groups including individual conductive lengths circumferentially spaced about on said carrying member;
said circumferentially spaced conductive lengths of one of said groups being connected by said projecting rings at each of the ends thereof into distinct sets;
said current collecting annular members being arranged for conductively relating each of said annular members with a respective one of said projecting rings; and
means for interconnecting said annular members to form a circuit with said sets of conductive length in series for voltage addition.

* * * * *